US012261362B2

(12) United States Patent
Stauss et al.

(10) Patent No.: US 12,261,362 B2
(45) Date of Patent: Mar. 25, 2025

(54) INTERNAL CONDUCTOR DEVICE FOR A WAVEGUIDE RADIATOR

(71) Applicant: Airbus Defence and Space GmbH, Taufkirchen (DE)

(72) Inventors: Oliver Stauss, Immenstaad (DE); Michael Korn, Immenstaad (DE); Alexander Herschlein, Immenstaad (DE); Hendrik Bayer, Immenstaad (DE); Catherine Haas, Immenstaad (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 17/773,473

(22) PCT Filed: Oct. 13, 2020

(86) PCT No.: PCT/EP2020/078799
§ 371 (c)(1),
(2) Date: Apr. 29, 2022

(87) PCT Pub. No.: WO2021/083661
PCT Pub. Date: May 6, 2021

(65) Prior Publication Data

US 2024/0186710 A1 Jun. 6, 2024

(30) Foreign Application Priority Data

Oct. 31, 2019 (EP) .................................... 19206608

(51) Int. Cl.
*H01Q 13/20* (2006.01)
*H01Q 21/00* (2006.01)

(52) U.S. Cl.
CPC ......... *H01Q 13/203* (2013.01); *H01Q 21/005* (2013.01)

(58) Field of Classification Search
CPC .... H01Q 13/203; H01Q 21/005; H01Q 13/22; H01Q 3/443
See application file for complete search history.

(56) References Cited

U.S. PATENT DOCUMENTS 3,524,190 A * 8/1970 Killion ................. H01Q 13/203 333/237
2015/0029069 A1* 1/2015 Roemer ................. H01Q 13/18 343/771
2019/0044226 A1* 2/2019 Yman ..................... H01P 5/026

FOREIGN PATENT DOCUMENTS

EP 2830156 B1 12/2016

OTHER PUBLICATIONS

European Search Report on the Patentability of Application No. 19206608.2, Mailed Apr. 17, 2020, 16 pages.

(Continued)

*Primary Examiner* — Hoang V Nguyen
*Assistant Examiner* — Yonchan J Kim
(74) *Attorney, Agent, or Firm* — Womble Bond Dickinson (US) LLP

(57) ABSTRACT

An internal conductor device for a waveguide radiator, in particular for a waveguide radiator has at least one slotted waveguide, at least one support rail, at least one dielectric unit that is arranged on the at least one support rail and comprises at least one dielectric element, and has at least one internal conductor that is arranged on the at least one dielectric unit, wherein the at least one internal conductor is fixed at least substantially mechanically on the at least one dielectric element and/or that the at least one dielectric element is fixed at least substantially mechanically on the at least one support rail.

13 Claims, 4 Drawing Sheets

(56) References Cited

OTHER PUBLICATIONS

Figure 1:
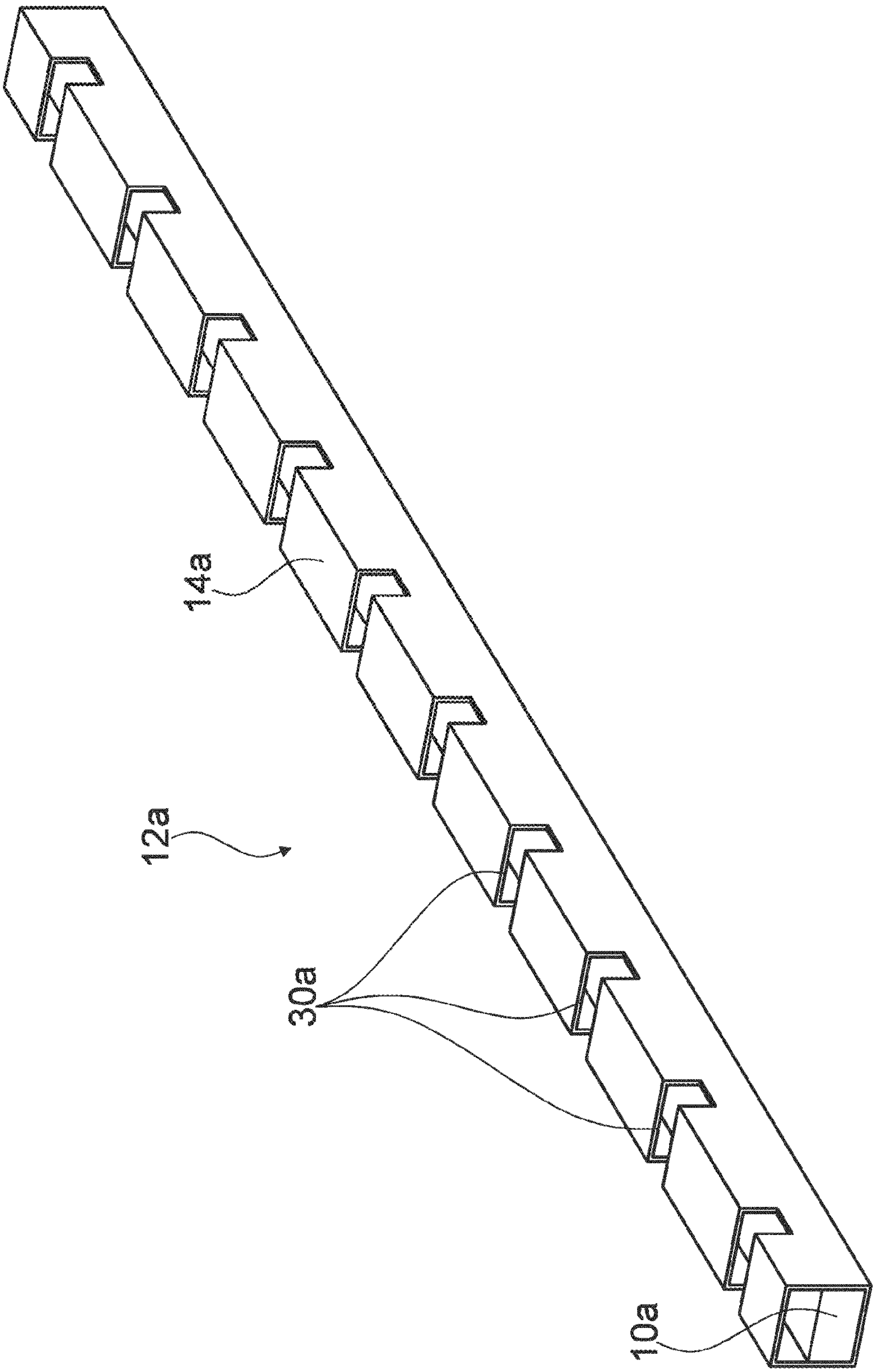

International Preliminary Report and Written Opinion on the Patentability of Application No. PCT/EP2020/078799, Mailed Jan. 20, 2021, 9 pages.

* cited by examiner

INTERNAL CONDUCTOR DEVICE FOR A WAVEGUIDE RADIATOR

RELATED APPLICATIONS

The present application is the National Phase of International Application No. PCT/EP2020/078799 filed on Oct. 13, 2020, which claims priority to the benefit of European Patent Application no. EP19206608.2 filed Oct. 31, 2019 and the disclosures of which are hereby incorporated herein by reference in their entireties.

PRIOR ART

The invention concerns an internal conductor device for a waveguide radiator, a waveguide radiator with the internal conductor device, a synthetic aperture radar system with at least one waveguide radiator and a method for producing the internal conductor device.

In EP 2 830 156 B1 an internal conductor device for a waveguide radiator, in particular for a waveguide radiator comprising at least one slotted waveguide, has already been proposed, with at least one support rail, with at last one dielectric unit that is arranged on the at least one support rail and comprises at least one dielectric element, and with at least one internal conductor that is arranged on the at least one dielectric unit.

The slotted waveguide radiators in particular require high-grade manufacturing accuracy. In this respect EP 2 830 156 B1 offers, for example, an assembly by gluing. Herein the RF performance may be influenced already by a glue thickness, which may result in dispersions or performance changes. Irregular application of glue quantities during manufacturing may therefore result in a dispersion of the RF performance. In particular, cost-intensive and time-consuming gluing processes may be necessary due to curing, possibly under pressure and temperature.

The objective of the invention is in particular to provide a generic device having favorable characteristics in regard to accuracy, in particular position accuracy, to reproducibility and to demountability. The objective is achieved according to the invention by the features of patent claim 1 while advantageous implementations and further developments of the invention may be gathered from the subclaims.

ADVANTAGES OF THE INVENTION

The invention is based on an internal conductor device for a waveguide radiator, in particular for a waveguide radiator with at least one slotted waveguide, with at least one support rail, with at least one dielectric unit that is arranged on the at least one support rail and comprises at least one dielectric element, and with at least one internal conductor that is arranged on the at least one dielectric unit.

It is proposed that the at least one internal conductor is fixed at least substantially mechanically on the at least one dielectric element, and/or that the at least one dielectric element is fixed at least substantially mechanically on the at least one support rail. Preferably the at least one internal conductor is completely mechanically fixed on the at least one dielectric element and/or the at least one dielectric element is completely mechanically fixed on the at least one support rail.

By an "internal conductor device" is in particular, in this context, a device to be understood which comprises an internal conductor and which is configured to be arranged in a waveguide, in particular a slotted waveguide, of a waveguide radiator. Waveguide radiators or antenna array radiators, which are in particular also referred to as radiators or sub-arrays in the literature, are employed for example in phased-array antennas of SAR (Synthetic Aperture Radar) systems with single or dual polarization. Up to now so-called microstrip patch antennas or slotted waveguide antennas have been used as radiators. If the waveguide has transversal slots, the direction of the radiated polarization of the waveguide corresponds to the longitudinal direction of the waveguide. If the waveguide has longitudinal slots, the direction of the radiated polarization of the waveguide corresponds to the transversal direction of the waveguide. Thus either horizontally or vertically polarized waves can be radiated, depending on an orientation of the slots. Depending on the orientation of the slots, the additional internal conductor mounted in the waveguide is shaped in such a way that the slots of the waveguide can be excited in phase. The waveguide radiator may here in particular be realized as a resonant radiator or in accordance with the traveling-wave principle. A dispersion-free transversal electromagnetic propagation mode (TEM mode) is supported by the internal conductor situated in the inner space of the slotted waveguide. Depending on a polarization, the internal conductor is specifically shaped such that it can excite either longitudinal slots or transversal slots.

The support rail in particular forms a base body of the internal conductor device, which is configured for an accommodation and/or orientation of the dielectric unit and/or of the internal conductor. The support rail extends along a main extension direction of the internal conductor, in particular at least over a large portion of an extension, in particular over a total extension, of the internal conductor. By a "main extension direction" of an object is herein in particular a direction to be understood which extends parallel to a longest edge of a smallest rectangular cuboid just still completely enclosing the object.

By a "dielectric unit" is in particular, in this context, a unit to be understood that is implemented at least partially, in particular largely and particularly preferentially completely of a dielectric material, in particular a material that is electrically poorly conductive or non-conductive. Preferably the dielectric unit comprises at least one dielectric element, which is embodied as a dielectric medium. Preferably the dielectric unit forms a dielectric layer between the internal conductor and the support rail. The dielectric unit is in particular configured for a shielding of the internal conductor. The height, respectively thickness, of the dielectric layer formed by the dielectric unit is constant along the support rail, in particular for resonant radiators, or is uneven with an individually shaped height progression, in particular for radiators following the traveling-wave principle. It is possible to selectively influence the amplitude and the phase of the electric field strength in the slots along the waveguide by a height progression and a shape of the internal conductor, such that any desired aperture assignments can be realized, for example in order to suppress sidelobes in the antenna diagram below a given value. In the same way homogeneous amplitude and phase assignments are achievable along the waveguide, for example in order to maximize antenna gain and to minimize half-power bandwidth.

"Fixed at least substantially mechanically [ . . . ]" is in particular to mean, in this context, that a holding force between the at least one internal conductor and the at least one dielectric element and/or between the at least one dielectric element and the at least one support rail is created mechanically by at least 50%, preferably by at least 70% and particularly preferentially by at least 90%. Herein it is in particular also conceivable that at least a portion of the holding force is created mechanically while a further portion is created magnetically. In this context, “fixed mechanically [ . . . ]” is in particular to mean that at least two components are connected via an, in particular releasable, force-fit and/or form-fit connection, a holding force between the two components being transferred preferably by a geometrical engagement of the components into one another and/or by a friction force between the components. A connection may herein be realized, for example, by a latch connection, a rivet connection, a plug connection and/or a screw connection. The mechanical connection is herein in particular free of a glued connection. By “form-fit” is in particular to be understood that adjoining surfaces of components connected in a form-fit manner exert a holding force onto each other that acts in the normal direction of the surfaces. In particular, the components are in a geometrical engagement with each other. “Configured” is in particular to mean specifically programmed, designed and/or equipped. By an object being configured for a certain function is in particular to be understood that the object fulfills and/or executes said certain function in at least one application state and/or operation state.

An implementation of the internal conductor device according to the invention in particular allows providing an internal conductor device that is advantageously easily mountable. In particular, very simple and quick mountability of the device is enabled. This is in particular brought about by a fixing only in points and thus simultaneous positioning of the components, preferentially realized by releasable mechanical connections. Therefore, if there is a defect component, repairing individual components is possible, which results in a low scrap rate in serial production. In particular, demountability and reusability of the individual components can be achieved. Furthermore, a high degree of precision of the internal conductor device as well as high reproducibility are achievable. It is moreover possible to achieve high accuracy, in particular position accuracy, of the components of the internal conductor device relative to one another. In particular, advantageous reproducibility and position accuracy of the components of the internal conductor device can be ensured in a cost-competitive efficient manner. In particular, manufacturing without a gluing process is enabled, with quickly joinable elements having high fitting accuracy. In particular, efficient and cost-competitive mounting of the internal conductor device is enabled independently from a mounting device.

Furthermore, it is proposed that the internal conductor device comprises at least one form-fitting and/or force-fitting element, which is configured for fixing the at least one internal conductor mechanically on the at least one dielectric element. The form-fitting and/or force-fitting element is in particular implemented by a separate element which is configured for a direct connection to the internal conductor and/or to the dielectric element. By a “form-fitting and/or force-fitting element” is in particular, in this context, an element to be understood which is configured to create a form-fit and/or force-fit connection between at least two components. Preferably, it is in particular to mean a connection element which is configured to directly enter a form-fit and/or force-fit connection with at least one, in particular with at least two, of the at least two components which are to be connected. A variety of implementations of the form-fitting and/or force-fitting element, deemed expedient by someone skilled in the art, are conceivable, like for example as a pin, as a wedge, as a latch pin, as a clamp and/or as a screw. Preferably the form-fitting and/or force-fitting element comprises a molded-on latch member. A “latch member” is in particular to mean, in this context, a spring-elastic member for establishing a latch connection, which is configured to be elastically deflected during mounting. This in particular allows providing an advantageous connection between the at least one internal conductor and the at least one dielectric element. It is in particular possible to provide an advantageously secure and easily implementable connection between the at least one internal conductor and the at least one dielectric element. In particular, in this way a fixing is achievable via a separate element, such that there is advantageously little adaption of the internal conductor. Moreover, demountability of the components can be ensured for the case of repair or re-machining. It is moreover possible to obtain reusability of the expensive milled components in the case of repair or demounting. In particular, loss of time due to re-acquisition of the component is avoidable.

It is further proposed that the at least one dielectric element has at least one recess and that the at least one form-fitting and/or force-fitting element is configured to latch in the recess of the dielectric element. Preferably the dielectric element forms a latch connection with the form-fitting and/or force-fitting element, wherein the form-fitting and/or force-fitting element is preferably deflected elastically in a fastening process and then latches behind a corresponding latch element, in particular the recess of the dielectric element, due to its inner resiliency. The recess of the dielectric element is in particular realized by a latching recess. Preferably the dielectric element in particular comprises a circumferential latch collar at a surface delimiting the recess. The recess is preferentially implemented by a through bore. However, it would also be conceivable that the recess is implemented by a blind hole. This in particular allows obtaining a connection that is advantageously easy to create. Furthermore, in this way in particular a direct connection can be realized.

It is also proposed that the at least one form-fitting and/or force-fitting element is embodied by a fixing pin. Preferably the form-fitting and/or force-fitting element is implemented by a pin. Especially preferentially the form-fitting and/or force-fitting element comprises a plate-shaped head and a latch pin that is molded to the head. However, principally a different implementation of the form-fitting and/or force-fitting element, deemed expedient by someone skilled in the art, would also be conceivable. The form-fitting and/or force-fitting element is preferably configured to extend through a recess in the internal conductor into the recess of the dielectric element. This in particular allows obtaining a mechanical connection that is advantageously easy to create. Furthermore, in this way in particular an advantageously secure and even connection is enabled, providing advantageously little perturbation. Another advantage of the concept described is the possibility of semi-automatization or full automatization, for example by means of a loading machine or robot work.

Beyond this it is proposed that the at least one support rail comprises at least one fixing element, which is configured to at least partially fix the at least one dielectric element of the dielectric unit relative to the support rail. Preferably the support rail comprises, on two sides facing away from each other, respectively one latch edge extending along the main extension direction of the support rail. Preferentially the latch edges extend along a total extension of the support rail. Preferably the at least one dielectric element is configured to latch with the latch edges. Particularly preferentially the at least one dielectric element is fixed transversally to a main extension direction via the latch edges. The fixing element is in particular configured to fix the at least one dielectric element at least along a longitudinal direction of the support rail, in particular in a tolerance-free manner. Different implementations of the fixing element, deemed expedient by someone skilled in the art, are conceivable. Preferably the fixing element is implemented by a pin, in particular a dowel pin, which is configured to engage into a recess of the at least one dielectric element. However, principally a different implementation of the fixing element, deemed expedient by someone skilled in the art, would be conceivable, in particular an implementation as an integrated latch marking. Preferentially the fixing element is configured for a positioning and fixing of the at least one dielectric element on the support rail in a defined position relative to the support rail. This in particular allows achieving very simple and quick mountability of the device. It is also possible to obtain a high accuracy of the internal conductor device as well as high reproducibility. The last degree of freedom of the dielectric unit in the support rail direction can be fixed via the fixing element.

It is furthermore proposed that the at least one dielectric unit comprises at least three dielectric elements. Preferably the at least three dielectric elements are implemented at least partially differing from one another. Preferentially at least two of the at least three dielectric elements have heights that differ from each other. Preferably the dielectric unit comprises a plurality of dielectric elements. The dielectric unit in particular comprises at least four, preferably at least eight, preferentially at least twelve and particularly preferentially at last sixteen dielectric elements. The number of dielectric elements is in particular freely selected depending on an antenna size. Particularly preferentially the number of dielectric elements of the dielectric unit is realized as an even number. In particular, the dielectric unit comprises different dielectric elements, wherein respectively two dielectric elements are implemented identically or mirror-symmetrically. In this way in particular an advantageously modular construction of the internal conductor device is achievable.

Moreover it is proposed that the dielectric elements are arranged in a form-fit manner in at least one row on the support rail. Preferably the dielectric elements are slid, plugged and/or clipped on the support rail one behind the other one. However, it would also be conceivable that the dielectric elements are attached on the support rail in several rows. Preferably the dielectric unit comprises two groups of dielectric elements, which are in each case arranged on opposite sides of the support rail. The dielectric elements are in particular arranged in an alignment, the dielectric unit being interrupted in a middle region of the support rail. Preferably, in particular in the case of radiators following the traveling-wave principle, a height of the dielectric elements increases from the middle region of the support rail toward the two end regions of the support rail. Principally, however, a different height progression, deemed expedient by someone skilled in the art, would also be conceivable. In this way in particular an advantageously modular construction of the internal conductor device is enabled. In particular, an advantageously variable arrangement of the dielectric elements on the support rail is achievable. It is furthermore possible to ensure demountability of the parts for the case of repair or of re-machining.

It is further proposed that the dielectric elements of the dielectric unit have at least partly different heights and/or different material thicknesses. Preferentially the dielectric unit comprises dielectric elements having different heights and/or different material thicknesses, wherein in particular in each case two dielectric elements have the same height and/or material thickness. Preferably the dielectric unit comprises several pairs of dielectric elements, which in each case have the same height and/or material thickness. The dielectric elements of a pair are in particular arranged on opposite sides of the internal conductor device. In particular, the dielectric elements of a pair are arranged on opposite sides of the internal conductor device with respect to a geometrical center of the internal conductor device. The pairs of dielectric elements are in particular all arranged symmetrically with respect to a geometrical center of the internal conductor device. Herein a feed point of the internal conductor device is not necessarily arranged in the geometric center of the internal conductor device. A "height" of a dielectric element is in particular to mean, in this context, an extension of the dielectric element perpendicularly to the main extension direction, in particular a main extension plane, of the support rail. By a "main extension plane" of a structural unit is in particular a plane to be understood that is parallel to a largest side surface of a smallest imaginary rectangular cuboid just still completely enclosing the structural unit, and that in particular extends through the center of the rectangular cuboid. It is possible to selectively influence the amplitude and phase of the electric field strength in the slots along the waveguide by the height progression, in particular also by a shape of the internal conductor, such that any desired aperture assignments can be realized, for example in order to suppress sidelobes in the antenna diagram below a given value. The dielectric elements in particular have different effective permittivities, the different effective permittivities of the dielectric elements being achieved in particular by different heights and/or different material thicknesses. This in particular allows achieving an advantageously modular construction of the internal conductor device.

It is also proposed that the at least one dielectric element of the dielectric unit is implemented as an open or closed hollow body. Preferably the at least one dielectric element at least partially delimits a hollow space. The hollow space may herein be realized so as to be closed or open toward an environment. Preferably the hollow space is delimited by the dielectric element towards at least two, preferably three, sides. Preferentially the hollow space is implemented by a rectangular volume. The at least one dielectric element preferably has an at least approximately U-shaped cross section. Preferably the at least one dielectric element has an at least approximately U-shaped cross section in a sectional plane that is perpendicular to a main extension direction of the dielectric element. The dielectric element is in particular made of a synthetic material. This in particular allows employing materials which are quickly and easily obtainable, thus holding provision costs at an advantageously low level. In this way it is in particular possible to influence, in particular adapt, an effective permittivity of the dielectric element. Furthermore, an advantageous mounting of the dielectric element on the support rail is thus achievable.

It is also proposed that the internal conductor device comprises a positioning unit, which is configured for a positioning of at least one of the dielectric elements of the dielectric unit floating relative to the support rail. Preferably the positioning unit comprises at least one first positioning member, which is realized in a fix, in particular integral, connection with the support rail, and at least one second positioning member, which is realized in a fix, in particular integral, connection with at least one of the dielectric elements. Preferentially, in a mounted state of the dielectric elements on the support rail, the at least one first positioning member and the at least one second positioning member interact for a positioning of the at least one dielectric element of the dielectric unit relative to the support rail. Particularly preferentially, the at least one first positioning member and the at least one second positioning member in particular interact in such a way that the dielectric element is fixed on the support rail with a defined tolerance. Preferably the fixing element of the support rail is configured to fix at least a first one of the dielectric elements rigidly on the support rail, wherein at least one dielectric element of the dielectric elements of the dielectric unit, which adjoins the first dielectric element, is configured to be positioned by means of the positioning unit floating relative to the support rail. Due to the segmentation of the dielectric unit and by means of the positioning unit and/or of the fixing element of the support rail, it is possible to build a system that is stable in terms of thermo-elasticity. It is in particular advantageously possible to compensate length expansions of the dielectric elements. Furthermore, for this purpose preferably gaps are provided between the dielectric elements, which in particular compensate the different length expansions. Only the difference between the length expansion coefficients of the internal conductor and the support rail is relevant for the thermoelastic stability of the system. Due to its relative expansion coefficient, when operated under temperature changes the employed segmented dielectric unit in particular does not induce any impermissible variation of the RF performance in comparison to the support rail.

Due to the segmentation of the dielectric unit and the arrangement of the fixings, it is possible to build an internal conductor device that is stable in terms of thermo-elasticity. In particular if for each dielectric element of the dielectric unit the fixing of the internal conductor is situated exactly above the fixing of the dielectric element, in particular the fixing of the dielectric element with the support rail, the length expansion of the dielectric elements has no relevance within the system of the internal conductor device. This is due to the gaps between the dielectric elements. Between the dielectric elements in particular gaps are arranged, corresponding to a maximally envisaged length expansion of the dielectric elements. The gaps compensate the different length expansions. Only the difference between the length expansion coefficients of the internal conductor and the support rail is relevant for the thermoelastic stability of the internal conductor device. A further advantage is the very simple and quick mountability of the internal conductor device. This is achieved by fixing only in points and thus simultaneous positioning of the components, realized preferably by releasable connections. Thus, if there is a defect component, repair of individual components will be possible, resulting in a very low scrap rate in serial production. It is in particular possible to produce radiators based on slotted coaxial conductors with a high degree of reproducibility and precision in order to ensure the desired RF characteristics. Moreover, in the case of geometry modifications or tests no additional or new tools will be required for an integration.

The invention is furthermore based on a waveguide radiator with at least one slotted waveguide comprising at least one surface having a plurality of slots, and with the internal conductor device arranged in the waveguide. This in particular allows providing a waveguide radiator that can be produced advantageously quickly and simply. Beyond this in particular advantageous repairability is achievable. It is in particular possible to selectively exchange individual elements.

The invention is further based on a synthetic aperture radar system, in particular a high-resolution synthetic aperture radar system, with the at least one waveguide radiator.

The invention is furthermore based on a method for producing the internal conductor device. It is preferably proposed that in at least one coupling step the dielectric elements of the dielectric unit are mounted mechanically on the support rail in at least one row in a defined sequence. Preferably the dielectric elements are plugged and/or slid onto the support rail behind one another. It would, however, also be conceivable that the dielectric elements are mounted on the support rail in several rows. The dielectric unit preferably comprises two groups of dielectric elements, which are in each case mounted mechanically in a row on the support rail on opposite-situated sides of the support rail. In this way in particular an advantageously modular construction of the internal conductor device is enabled. In particular, an advantageously variable arrangement of the dielectric elements on the support rail is enabled. In particular, efficient and cost-competitive production of the internal conductor device is achievable independently from a mounting device.

Beyond this it is proposed that in at least one coupling step the internal conductor is positioned on the dielectric unit and is fixed on the dielectric unit mechanically by means of at least one form-fitting and/or force-fitting element. The form-fitting and/or force-fitting element is in particular implemented by a separate element, which is connected to at least one dielectric element via the internal conductor. The at least one dielectric element of the dielectric unit realizes a latch connection with the form-fitting and/or force-fitting element, wherein in a fastening process the form-fitting and/or force-fitting element is elastically deflected and then latches behind a corresponding latch element, in particular the recess of the dielectric element, due to its inner resiliency. Preferably the form-fitting and/or force-fitting element extends into the recess of the dielectric element through a recess in the internal conductor. This in particular allows achieving a connection that can be created in an advantageously simple manner. Furthermore, in this way in particular a direct connection can be realized. It is thus in particular possible to achieve cost-competitive and reproducible manufacturing of the internal conductor device, attaining the required RF performance. Beyond this an advantageously short manufacturing time is achievable in comparison to glued internal conductor devices, which results in a considerable financial saving potential. A further advantage is the possibility of partial or complete automatization, like for example by loading machines or robot work.

Herein the internal conductor device according to the invention, the waveguide radiator, the synthetic aperture radar system and the method shall not be limited to the application and implementation described above. In particular, for the purpose of fulfilling a functionality that is described here, the internal conductor device according to the invention, the waveguide radiator, the synthetic aperture radar system and the method may comprise a number of individual elements, components, units and method steps that differs from a number given here. Moreover, regarding the value ranges given in the present disclosure, values situated within the limits mentioned shall also be considered to be disclosed and to be applicable according to requirements.

DRAWINGS

Further advantages will become apparent from the following description of the drawings. In the drawings two exemplary embodiments of the invention are illustrated. The drawings, the description and the claims contain a plurality of features in combination. Someone skilled in the art will purposefully also consider the features separately and will find further expedient combinations.

Figure 2:
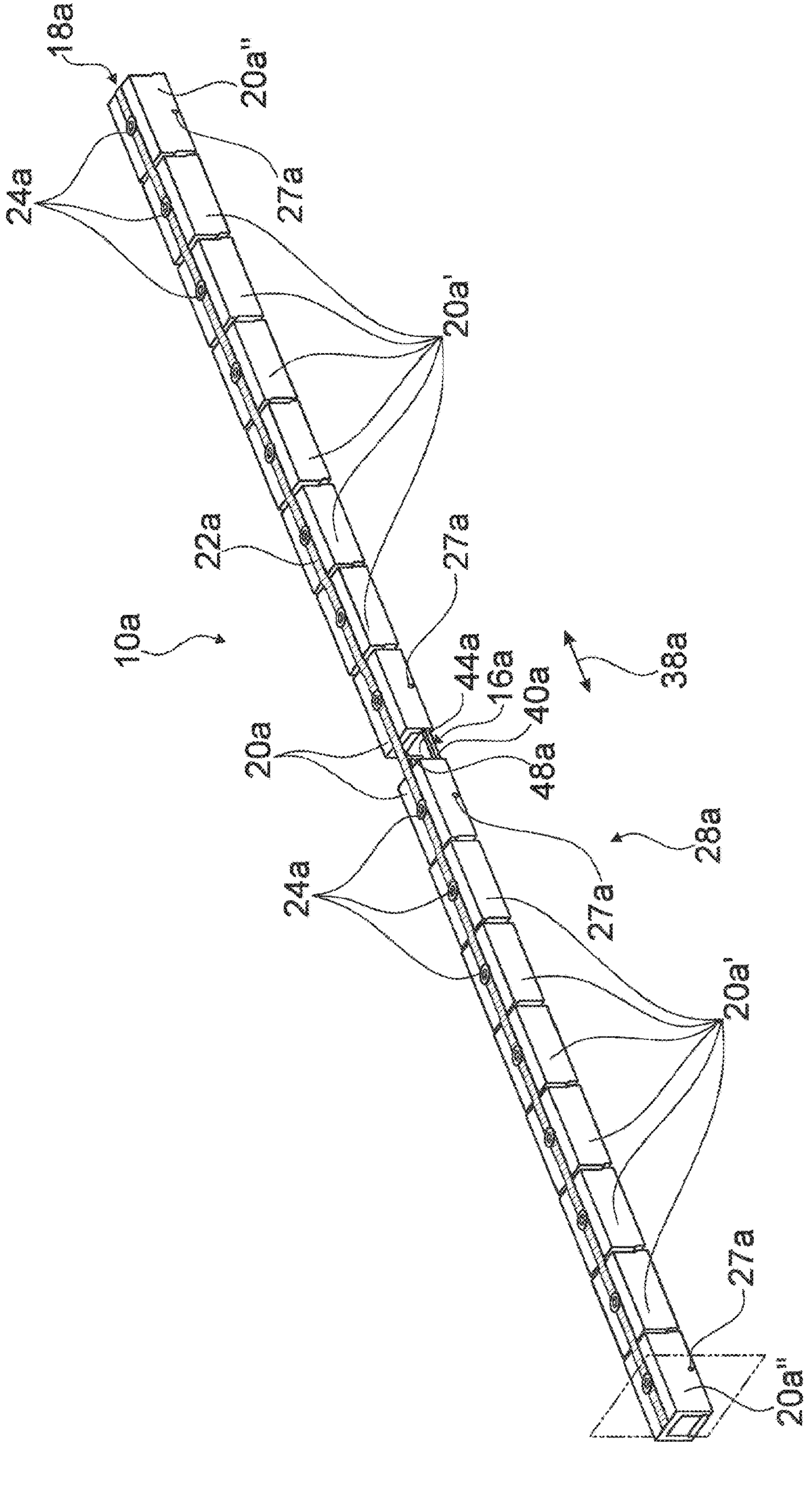
Figure 3:
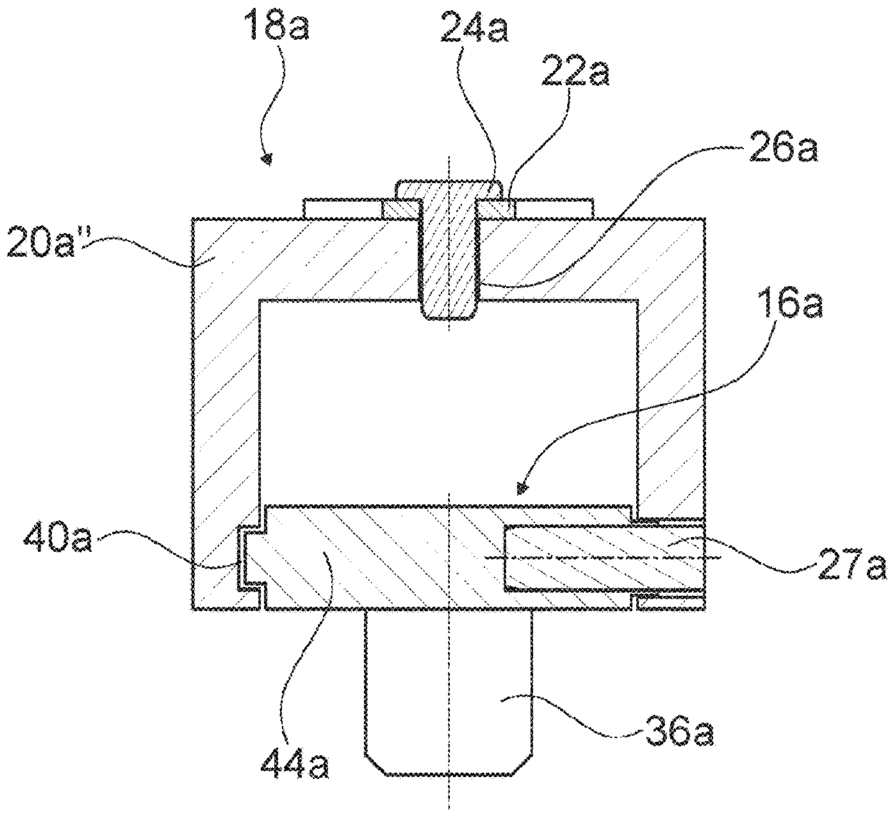
Figure 4:
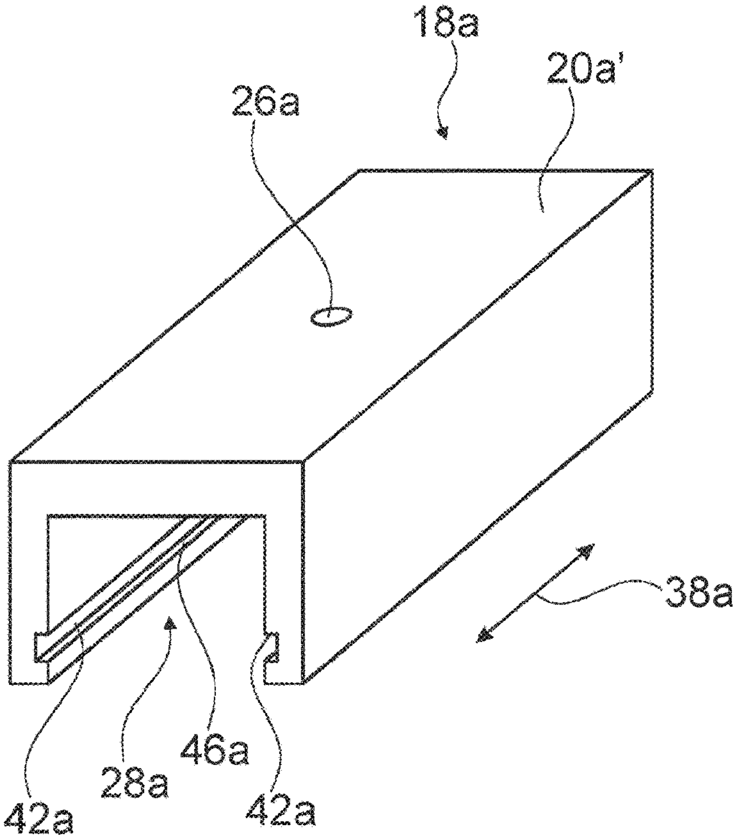
Figure 5:
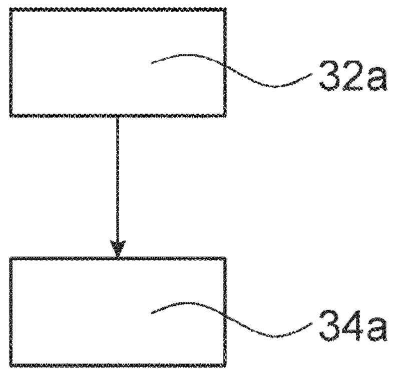
Figure 6:
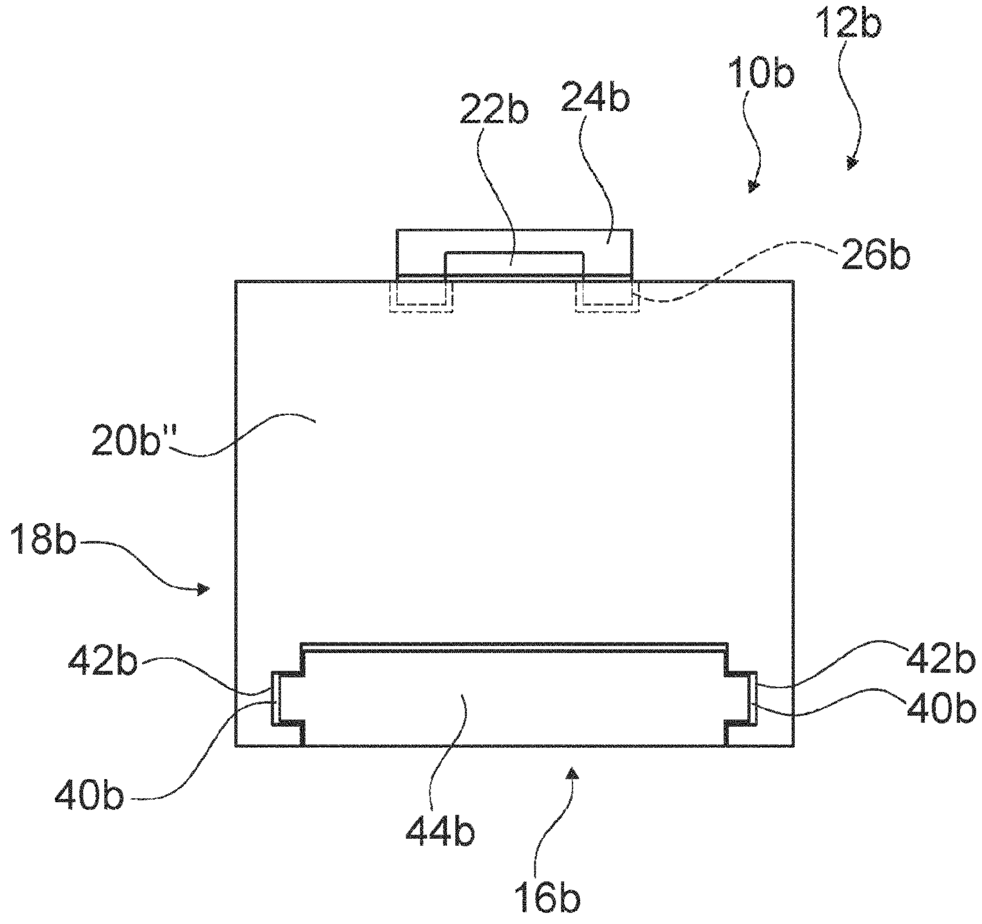

FIG. 1 a waveguide radiator with a waveguide and with an internal conductor device according to the invention, in a schematic illustration, FIG. 2 the internal conductor device according to the invention with a support rail, with a dielectric unit comprising several dielectric elements and with an internal conductor, in a schematic illustration, FIG. 3 the internal conductor device with the support rail, with the dielectric unit and with the internal conductor, in a schematic sectional view along the section line III-III, FIG. 4 a dielectric element of the dielectric unit of the internal conductor device according to the invention, in a schematic illustration, FIG. 5 a flow chart of a method for producing the internal conductor device according to the invention, and FIG. 6 an alternative internal conductor device according to the invention with a support rail, with a dielectric unit and with an internal conductor, in a schematic illustration.

DESCRIPTION OF THE EXEMPLARY EMBODIMENTS

FIG. 1 shows a waveguide radiator 12*a* with a waveguide 14*a* and with an internal conductor device 10*a*. The waveguide radiator 12*a* is designed for a synthetic aperture radar system, in particular for a high-resolution synthetic aperture radar system. The waveguide radiator 12*a* forms part of a synthetic aperture radar system. The waveguide 14*a* is implemented by a slotted waveguide 14*a*. The waveguide 14*a* is implemented by a rectangular profile having a plurality of slots 30*a* along its main extension direction. The waveguide 14*a* comprises at least one surface having a plurality of slots 30*a*. The slots 30*a* are preferably arranged in a regular distribution. By way of example, the waveguide 14*a* has transversal slots 30*a* extending completely over an upper side and partially over two sides of the waveguide 14*a*. If the waveguide 14*a* has transversal slots 30*a*, the direction of the radiated polarization of the waveguide 14*a* corresponds to the longitudinal direction of the waveguide 14*a*. If alternatively the waveguide 14*a* has longitudinal slots, the direction of the radiated polarization of the waveguide 14*a* corresponds to the transversal direction of the waveguide 14*a*. Thus either horizontally polarized waves or vertically polarized waves can be radiated, depending on an orientation of the slots 30*a*.

The waveguide 14*a* is configured for receiving the internal conductor device 10*a*. The internal conductor device 10*a* is arranged in the waveguide 14*a*. The internal conductor device 10*a* is arranged in the waveguide 14*a* in a positionally fixed manner. The internal conductor device 10*a* is arranged in the waveguide 14*a* in a positionally fixed manner via projections 36*a*, in particular via projections 36*a* on an underside of a support rail 16*a* of the internal conductor device 10*a* (not shown in detail). The projections 36*a* of the internal conductor device 10*a* in particular engage into recesses of the waveguide 14*a* (not shown in detail).

The internal conductor device 10*a* comprises a support rail 16*a*. The support rail 16*a* is realized by an aluminum rail. However, principally a different implementation of the support rail 16*a*, deemed expedient by someone skilled in the art, would also be conceivable. The support rail 16*a* forms a base body of the internal conductor device 10*a*, which is configured for an accommodation and/or orientation of a dielectric unit 18*a* and/or of an internal conductor 22*a*. The support rail 16*a* extends along a main extension direction 38*a* of the internal conductor device 10*a* over an entire extent of the internal conductor device 10*a*. The support rail 16*a* has an at least approximately rectangular cross section, wherein the support rail 16*a* comprises, on two sides that face away from each other, respectively one latch edge 40*a* extending along the main extension direction 38*a* of the internal conductor device 10*a*. The latch edges 40*a* in each case run along an entire extent of the support rail 16*a*. The support rail 16*a* further comprises on an underside a plurality of projections 36*a*, which are configured for a connection and positioning of the internal conductor device 10*a* to and in the waveguide 14*a*.

Beyond this the internal conductor device 10*a* comprises a dielectric unit 18*a*, which is arranged on the support rail 16*a*. The dielectric unit 18*a* extends along the main extension direction 38*a* of the internal conductor device 10*a* over a substantial portion of an extent of the support rail 16*a*. The dielectric unit 18*a* is recessed in a middle region of the support rail 16*a*. The height, respectively thickness, of the dielectric layer formed by the dielectric unit 18*a* along the support rail 16*a* is not regular but has an individually shaped height progression. It is possible to selectively influence the amplitude and phase of the electric field strength in the slots 30*a* by the height progression and by a shape of an internal conductor 22*a*, such that any required aperture assignments can be realized, for example in order to suppress sidelobes in the antenna diagram below a given value. In the same way homogeneous amplitude and phase assignments can be obtained, for example for a maximization of antenna gain and for a minimization of half-power bandwidth.

The dielectric unit 18*a* comprises at least one dielectric element 20*a*, 20*a*', 20*a*". The dielectric unit 18*a* comprises a plurality of dielectric elements 20*a*, 20*a*', 20*a*". The dielectric unit 18*a* comprises at least four, preferably at least eight, preferentially at least twelve and particularly preferentially at least sixteen dielectric elements 20*a*, 20*a*', 20*a*". The dielectric elements 20*a*, 20*a*', 20*a*" are arranged on the support rail 16*a* in a form-fit manner in a row. The dielectric elements 20*a*, 20*a*', 20*a*" are plugged on the support rail 16*a* behind one another. It would, however, also be conceivable that the dielectric elements 20*a*, 20*a*', 20*a*" are arranged on the support rail 16*a* in several rows. The dielectric unit 18*a* comprises two groups of dielectric elements 20*a*, 20*a*', 20*a*", which are in each case arranged on opposite-situated sides of the support rail 16*a*. The dielectric elements 20*a*, 20*a*', 20*a*" are arranged in an alignment. By way of example, the height of the dielectric elements 20*a*, 20*a*', 20*a*" increases from the middle region of the support rail 16*a* toward the two end regions of the support rail 16*a*. The dielectric elements 20*a*, 20*a*', 20*a*" of a group are implemented respectively differently from one another, the groups of dielectric elements 20*a*, 20*a*', 20*a*" comprising dielectric elements 20*a*, 20*a*', 20*a*" which respectively correspond to each other. The dielectric elements 20*a*, 20*a*', 20*a*" of the dielectric unit 18*a* at least partly have different heights and/or different material thicknesses. The dielectric elements 20*a*, 20*a*', 20*a*" of a group of the dielectric unit 18*a* have different heights. Preferentially the dielectric unit 18*a* comprises dielectric elements 20*a*, 20*a*', 20*a*" having different heights, wherein respectively two dielectric elements 20*a*, 20*a*', 20*a*" have the same height. The groups of the dielectric unit 18*a* in each case comprise a first dielectric element 20*a*, which is arranged closest to a middle of the support rail 16*a*. The two first dielectric elements 20*a* in particular have a smallest height of the dielectric elements 20*a*, 20*a*', 20*a*". The groups of the dielectric unit 18*a* furthermore in each case comprise a last dielectric element 20*a*", which is respectively arranged closest to one of the end regions of the support rail 16*a*. The two last dielectric elements 20*a*" in particular have a greatest height of the dielectric elements 20*a*, 20*a*', 20*a*". Furthermore the groups of the dielectric unit 18*a* in each case comprise several further dielectric elements 20*a*', which are respectively arranged between the first dielectric element 20*a* and the last dielectric element 20*a*".

The dielectric elements 20*a*, 20*a*', 20*a*" of the dielectric unit 18*a* are in each case realized as an open or closed hollow body. The dielectric elements 20*a*, 20*a*', 20*a*" respectively delimit a hollow space. The hollow space is in each case implemented open towards an environment. The hollow space of the dielectric elements 20*a*, 20*a*', 20*a*" of the dielectric unit 18*a* is in each case realized by a rectangular volume. The dielectric elements 20*a*, 20*a*', 20*a*" of the dielectric unit 18*a* in each case have an approximately U-shaped cross section. The dielectric elements 20*a*, 20*a*', 20*a*" of the dielectric unit 18*a* in each case have an approximately U-shaped cross section in a sectional plane perpendicular to a main extension direction of the respective dielectric element 20*a*, 20*a*', 20*a*". However, principally a different shaping of the dielectric elements 20*a*, 20*a*', 20*a*", deemed expedient by someone skilled in the art, would also be conceivable.

The dielectric elements 20*a*, 20*a*', 20*a*" are fixed at least substantially mechanically on the support rail 16*a*. The dielectric elements 20*a*, 20*a*', 20*a*" are latched onto the support rail 16*a*. The dielectric elements 20*a*, 20*a*', 20*a*" are configured to latch with the latch edges 40*a* of the support rail 16*a*. The dielectric elements 20*a*, 20*a*', 20*a*" have latch recesses 42*a* corresponding to the latch edges 40*a*. The latch recesses 42*a* are in each case arranged on the inner face of the free ends of the U-shaped cross section of the dielectric elements 20*a*, 20*a*', 20*a*". The dielectric elements 20*a*, 20*a*', 20*a*" are fixed via the latch connection transversally to the main extension direction 38*a* of the internal conductor device 10*a*.

The support rail 16*a* furthermore comprises at least one fixing element 27*a*, which is configured for fixing at least one dielectric element 20*a*, 20*a*" of the dielectric unit 18*a* at least partially relative to the support rail 16*a*. The support rail 16*a* comprises several, in particular four, fixing elements 27*a*, which are configured for partially fixing the first and last dielectric elements 20*a*, 20*a*" of the dielectric unit 18*a* relative to the support rail 16*a*. The fixing elements 27*a* are configured for fixing the first and last dielectric elements 20*a*, 20*a*" along a longitudinal direction of the support rail 16*a* free of tolerance. The fixing elements 27*a* are in each case implemented by a pin configured to engage into a recess 26*a* of the respective dielectric element 20*a*, 20*a*". Principally, however, a different implementation of the fixing elements 27*a*, deemed expedient by someone skilled in the art, would also be conceivable. It would alternatively also be conceivable that the fixing elements 27*a* fix only the first or the last dielectric elements 20*a*, 20*a*" of the dielectric unit 18*a*. The fixing elements 27*a* are also configured for positioning and fixing the first and last dielectric elements 20*a*, 20*a*" of the dielectric unit 18*a* on the support rail 16*a* in a defined position relative to the support rail 16*a*. The fixing elements 27*a* are releasably connected to a base body 44*a* of the support rail 16*a*. The fixing elements 27*a* are screwed into the base body 44*a* of the support rail 16*a* in a region of one of the latch edges 40*a*. However, principally it would also be conceivable that the fixing elements 27*a* are connected to the base body 44*a* integrally.

The internal conductor device 10*a* further comprises a positioning unit 28*a*, which is configured for positioning at least one of the dielectric elements 20*a*' of the dielectric unit 18*a* floating relative to the support rail 16*a*. The positioning unit 28*a* is configured for positioning the further dielectric elements 20*a*' of the dielectric unit 18*a* floating relative to the support rail 16*a*. The positioning unit 28*a* comprises several first positioning members which are implemented fixedly, in particular integrally, with the support rail 16*a*. The positioning unit 28*a* further comprises several second positioning members 46*a* which are implemented fixedly, in particular integrally, with respectively one of the further dielectric elements 20*a*'. Respectively two of the second positioning members 46*a* are implemented integrally with respectively one of the further dielectric elements 20*a*'. The positioning members 46*a* are in each case arranged, on opposite-situated sides, in the latch recesses 42*a* of the respective further dielectric element 20*a*'. In a mounted state of the further dielectric elements 20*a*' on the support rail 16*a*, the first positioning member and the second positioning members 46*a* interact for a positioning of the further dielectric elements 20*a*' of the dielectric unit 18*a* relative to the support rail 16*a*. The first positioning member and the second positioning members 46*a* interact in such a way that the respective further dielectric element 20*a*' is fixed on the support rail 16*a* with a defined tolerance. The fixing elements 27*a* of the support rail 16*a* are configured to fix the first and last dielectric elements 20*a*, 20*a*" rigidly on the support rail 16*a*, whereas the further dielectric elements 20*a*' are positioned by means of the positioning unit 28*a* in such a way that they are floating relative to the support rail 16*a* between the first and last dielectric elements 20*a*, 20*a*". The first positioning members of the positioning unit 28*a* are exemplarily implemented by deepenings in the latch edges 40*a* of the support rail 16*a*. The second positioning members 46*a* of the positioning unit 28*a* are exemplarily implemented by elevations in the latch recesses 42*a* of the further dielectric elements 20*a*'. Preferably the second positioning members 46*a* are produced by the section-wise interruption of the latch recesses 42*a*.

Beyond this the internal conductor device 10*a* comprises an internal conductor 22*a*, which is arranged on the dielectric unit 18*a*. The internal conductor 22*a* is realized by a copper conductor. The internal conductor 22*a* mounted in the waveguide 14*a* is arranged facing toward the slots 30*a* of the waveguide 14*a*. Depending on the orientation of the slots 30*a*, the internal conductor 22*a* is shaped so as to enable a feeding according to the traveling-wave principle, wherein all the slots 30*a* of the waveguide 14*a* can be excited in phase. The internal conductor 22*a* is specifically shaped depending on a polarization, so as to be capable of exciting either longitudinal or horizontal slots 30*a*. In a middle region of the support rail 16*a*, the internal conductor 10*a* is connected to the support rail 16*a* via a feed line 48*a*. The internal conductor 22*a* is actuated via the feed line 48*a*. The feed line 48*a* serves for feeding and is electrically connected to the internal conductor 22*a*. The feed line 48*a* is mechanically load-free. The internal conductor 22*a* is furthermore fixed mechanically on the dielectric elements 20*a*, 20*a*', 20*a*". The internal conductor device 10*a* comprises several form-fitting and/or force-fitting elements 24*a*, which are configured to fix the internal conductor 22*a* mechanically on the dielectric elements 20*a*, 20*a*', 20*a*". The form-fitting and/or force-fitting elements 24*a* are implemented by separate elements configured for a direct connection to the internal conductor 22*a* and/or to the dielectric elements 20*a*, 20*a*', 20*a*". The form-fitting and/or force-fitting elements 24*a* respectively comprise a molded-on latch member. The dielectric elements 20*a*, 20*a*', 20*a*" in each case have a recess 26*a*. The recesses 26*a* are in each case arranged on an upper side of the respective dielectric element 20*a*, 20*a*', 20*a*". The recesses 26*a* are in each case implemented by a through bore. The form-fitting and/or force-fitting elements 24*a* are configured to latch in the recesses 26*a* of the dielectric elements 20*a*, 20*a*', 20*a*". The dielectric elements 20*a*, 20*a*', 20*a*" respectively form a latch connection with the form-fitting and/or force-fitting elements 24*a* wherein, during a fastening process, the form-fitting and/or force-fitting elements 24*a* are in each case partly deflected elastically and then latch in behind a corresponding latch element of the recess 26*a* of the respective dielectric element 20*a*, 20*a*', 20*a*" due to their internal resiliency. The recesses 26*a* of the dielectric elements 20*a*, 20*a*', 20*a*" are realized by a latch recess. The dielectric elements 20*a*, 20*a*', 20*a*" have a circumferential latch collar at a surface delimiting the recess 26*a* of the respective dielectric element 20*a*, 20*a*', 20*a*". The form-fitting and/or force-fitting elements 24*a* are in each case implemented by a fixing pin. The form-fitting and/or force-fitting elements 24*a* are in each case implemented by a pin. The form-fitting and/or force-fitting elements 24*a* in each case have a plate-shaped head and a latch pin that is molded to the head. However, a different implementation of the form-fitting and/or force-fitting elements 24*a*, deemed expedient by someone skilled in the art, would also be conceivable. The form-fitting and/or force-fitting elements 24*a* are in each case configured to extend into the recess 26*a* of one of the dielectric elements 20*a*, 20*a*', 20*a*" through a recess in the internal conductor 22*a*. The internal conductor 22*a* has a plurality of recesses that correspond to the recesses 26*a* of the dielectric elements 20*a*, 20*a*', 20*a*". By way of example, the recesses of the internal conductor 22*a* are implemented by long holes, in particular by punched long holes. Due to an implementation of the recesses of the internal conductor 22*a* as long holes, in particular a slight movement of the dielectric elements 20*a*, 20*a*', 20*a*" relative to the internal conductor 22*a*, which is in particular for example due to temperature expansion of the dielectric elements 20*a*, 20*a*', 20*a*", may be enabled.

FIG. 5 shows a flow chart of a method for producing the internal conductor device 10*a*. The internal conductor device 10*a* is in particular produced free of glue connections. In the method, in a first coupling step 32*a* the dielectric elements 20*a*, 20*a*', 20*a*" of the dielectric unit 18*a* are mounted mechanically onto the support rail 16*a* in a row in a defined sequence. For this in particular the two first dielectric elements 20*a* are slid, plugged and/or clipped onto the support rail 16*a* and are fixed by means of the fixing elements 27*a*. After that in particular the further dielectric elements 20*a*' are plugged onto the support rail 16*a* and are positioned by means of the positioning unit 28*a*. Then the last dielectric elements 20*a*" are slid, plugged and/or clipped onto the support rail 16*a* and are fixed by means of the fixing elements 27*a*. Furthermore, in a further coupling step 34*a* the internal conductor 22*a* is positioned on the dielectric unit 18*a* and is fixed mechanically on the dielectric unit 18*a* by means of the form-fitting and/or force-fitting elements 24*a*. The form-fitting and/or force-fitting elements 24*a* are plugged through the recesses in the internal conductor 22*a* into the recesses 26*a* of the dielectric elements 20*a*, 20*a*', 20*a*" and are latched with the dielectric elements 20*a*, 20*a*', 20*a*". Introducing the form-fitting and/or force-fitting elements 24*a* may be brought about, for example, via a loading machine.

In FIG. 6 a further exemplary embodiment of the invention is illustrated. The following description is essentially limited to the differences between the exemplary embodiments, wherein regarding components, features and functions that remain the same the description of the exemplary embodiment of FIGS. 1 to 5 may be referred to. In order to distinguish between the exemplary embodiments, the letter a of the reference numerals of the exemplary embodiment in FIGS. 1 to 5 has been substituted by the letter b in the reference numerals of FIG. 6. Regarding components having the same denomination, in particular components having the same reference numerals, principally the drawings and/or the description of the exemplary embodiment of FIGS. 1 to 5 may be referred to.

FIG. 6 shows an alternative internal conductor device 10*b* with a support rail 16*b*, with a dielectric unit 18*b* and with an internal conductor 22*b*. The dielectric unit 18*b* comprises a plurality of dielectric elements 20*b*". Furthermore, the internal conductor 22*b* is fixed mechanically on the dielectric elements 20*b*. The internal conductor device 10*b* comprises several form-fitting and/or force-fitting elements 24*b*, which are configured for fixing the internal conductor 22*b* mechanically on the dielectric elements 20*b*. The form-fitting and/or force-fitting elements 24*b* are implemented by separate elements, which are configured for a direct connection to the internal conductor 22*b* and/or to the dielectric elements 20*b*. The form-fitting and/or force-fitting elements 24*b* in each case comprise molded-on latch members. The dielectric elements 20*b* in each case have two recesses 26*b*. The recesses 26*b* are in each case arranged next to each other on an upper side of the respective dielectric element 20*b*. The recesses 26*b* are implemented in each case by blind holes. The form-fitting and/or force-fitting elements 24*b* are configured for latching in the recesses 26*a* of the dielectric elements 20*b*. The dielectric elements 20*b* in each case form a latch connection with the form-fitting and/or force-fitting elements 24*b*, wherein during a fastening process the form-fitting and/or force-fitting elements 24*b* are respectively partly deflected elastically and then latch in behind a corresponding latch element of the recess 26*b* of the respective dielectric element 20*b* due to their internal resiliency. The form-fitting and/or force-fitting elements 24*b* are in each case embodied by a fixing clamp. The form-fitting and/or force-fitting elements 24*b* have a U-shape. The form-fitting and/or force-fitting elements 24*b* are in each case configured to engage over the internal conductor 22*b* and to engage on both sides of the internal conductor 22*b* into the recesses 26*b* of one of the dielectric elements 20*b*.

REFERENCE NUMERALS

10 internal conductor device
12 waveguide radiator
14 waveguide
16 support rail
18 dielectric unit
20 dielectric element
22 internal conductor
24 form-fitting and/or force-fitting element
26 recess
27 fixing element
28 positioning unit
30 slot
32 coupling step

34 coupling step
36 projection
38 main extension direction
40 latch edge
42 latch recess
44 base body
46 positioning member
48 feed line

The invention claimed is:

1. An internal conductor device for a waveguide radiator, in particular for a waveguide radiator with at least one slotted waveguide, with at least one support rail, with at least one dielectric unit that is arranged on the at least one support rail and comprises at least one dielectric element, and with at least one internal conductor that is arranged on the at least one dielectric unit, wherein the at least one internal conductor is fixed at least substantially mechanically on the at least one dielectric element and/or that the at least one dielectric element is fixed at least substantially mechanically on the at least one support rail, the internal conductor device further comprising at least one form-fitting and/or force-fitting element, which is configured for fixing the at least one internal conductor mechanically on the at least one dielectric element, wherein the at least one dielectric element has at least one recess and the at least one form-fitting and/or force-fitting element is configured to latch in the at least one recess of the dielectric element.

2. The internal conductor device according to claim 1, wherein the at least one form-fitting and/or force-fitting element is embodied by a fixing pin.

3. The internal conductor device according to claim 1, wherein the at least one support rail comprises at least one fixing element, which is configured to fix at least a part of the at least one dielectric element of the dielectric unit relative to the support rail.

4. The internal conductor device according to claim 1, wherein the at least one dielectric unit comprises at least three dielectric elements.

5. The internal conductor device according to claim 4, wherein the at least three dielectric elements are arranged in a form-fit manner in at least one row on the at least one support rail.

6. The internal conductor device according to claim 4, wherein the at least three dielectric elements of the at least one dielectric unit have at least partly different heights and/or different material thicknesses.

7. The internal conductor device according to claim 4, comprising a positioning unit, which is configured for a positioning of at least one of the at least three dielectric elements of the at least one dielectric unit floating relative to the at least one support rail.

8. A method for producing an internal conductor device according to claim 4, wherein in at least one coupling step the at least three dielectric elements of the at least one dielectric unit are mounted mechanically on the at least one support rail in at least one row in a defined sequence.

9. The internal conductor device according to claim 1, wherein the at least one dielectric element of the at least one dielectric unit is implemented as an open or closed hollow body.

10. A waveguide radiator with at least one slotted waveguide comprising at least one surface having a plurality of slots, and with an internal conductor device according to claim 1 which is arranged in the at least one slotted waveguide.

11. A synthetic aperture radar system, wherein the synthetic aperture radar system is a high-resolution synthetic aperture radar system, with at least one waveguide radiator according to claim 10.

12. A method for producing an internal conductor device according to claim 1.

13. The method according to claim 12, wherein in at least one coupling step the at least one internal conductor is positioned on the at least one dielectric unit and is mechanically fixed on the at least one dielectric unit by means of at least one form-fitting and/or force-fitting element.

* * * * *